United States Patent
Decker et al.

(10) Patent No.: US 10,037,166 B2
(45) Date of Patent: Jul. 31, 2018

(54) TRACKING MEMORY ALLOCATION (71) Applicant: GE Aviation Systems LLC, Grand Rapids, MI (US)

(72) Inventors: Christian Reynolds Decker, Ada, MI (US); Troy Stephen Brown, Kalamazoo, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 37 days.

(21) Appl. No.: 15/226,988

(22) Filed: Aug. 3, 2016

(65) Prior Publication Data
US 2018/0039445 A1    Feb. 8, 2018

(51) Int. Cl.
G06F 12/00    (2006.01)
G06F 3/06    (2006.01)
G06F 12/0813    (2016.01)

(52) U.S. Cl.
CPC .......... G06F 3/0653 (2013.01); G06F 3/0604 (2013.01); G06F 3/064 (2013.01); G06F 3/0631 (2013.01); G06F 3/0632 (2013.01); G06F 3/0673 (2013.01); G06F 12/0813 (2013.01)

(58) Field of Classification Search
None
See application file for complete search history.

(56) References Cited

U.S. PATENT DOCUMENTS

| | | |
|---|---|---|
| 5,715,447 A | 2/1998 | Hayashi et al. |
| 5,797,138 A | 8/1998 | Park et al. |
| 7,116,635 B2 * | 10/2006 | Nakano .................. G06F 9/4881 370/230 |
| 9,098,462 B1 | 8/2015 | McNicholl et al. |
| 9,152,603 B1 * | 10/2015 | Kelly, III .......... G06F 15/17331 |
| 2002/0144010 A1 | 10/2002 | Younis et al. |
| 2003/0021228 A1 * | 1/2003 | Nakano .................. G06F 9/4881 370/229 |
| 2012/0233472 A1 * | 9/2012 | Faraboschi ......... G06F 12/0246 713/190 |

(Continued)

FOREIGN PATENT DOCUMENTS

| | | |
|---|---|---|
| EP | 0551528 A1 | 7/1993 |
| EP | 2246786 A1 | 11/2010 |

OTHER PUBLICATIONS

Extended European Search Report and Opinion issued in connection with corresponding EP Application No. 17184508.4 dated Dec. 19, 2017.

*Primary Examiner* — Brian Peugh
(74) *Attorney, Agent, or Firm* — GE Aviation Systems LLC; William Andes (57) ABSTRACT

Systems and methods for tracking memory allocation within shared memory are provided. In one embodiment, a method includes tracking memory allocation within shared memory. The method includes receiving instructions to execute a process. The method includes assigning a process identifier to the process. The method includes allocating one or more blocks of the shared memory to store process specific data associated with the process, wherein the one or more blocks of the shared memory are addressable with a reference. The method includes storing the process identifier at an index in a first array. The method includes storing, by the one or more processors, the reference to the one or more blocks of the shared memory at the index in a second array.

19 Claims, 6 Drawing Sheets

(56) References Cited

U.S. PATENT DOCUMENTS

2013/0132699 A1     5/2013   Vaishampayan et al.
2013/0262423 A1   10/2013   Graefe et al.
2015/0261670 A1     9/2015   Cheriton
2016/0080491 A1     3/2016   Sykes et al.

* cited by examiner

TRACKING MEMORY ALLOCATION

FIELD

The present subject matter relates generally to computing systems, and more particularly to tracking memory allocation.

BACKGROUND

One or more computing device(s) can execute multiple processes. The one or more computing device(s) can include shared resources, such as shared memory for the multiple processes executing. The one or more computing device(s) can allocate the resources, such as the memory, for the multiple processes executing. When multiple processes contribute to the shared resources, such as the shared memory, memory corruption and/or memory leaks can occur during initialization and/or reinitialization of a system.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for tracking memory allocation within shared memory. The method includes receiving instructions to execute a process. The method includes assigning a process identifier to the process. The method includes allocating one or more blocks of the shared memory to store process specific data associated with the process, wherein the one or more blocks of the shared memory are addressable with a reference. The method includes storing the process identifier at an index in a first array. The method includes storing, by the one or more processors, the reference to the one or more blocks of the shared memory at the index in a second array.

Another example aspect of the present disclosure is directed to a system for tracking memory allocation within shared memory in a vehicle. The system includes one or more processors and one or more memory devices. The one or more memory devices store instructions that when executed by the one or more processors cause the one or more processors to perform operations. The operations include executing a process. The process includes a process identifier and process specific data. The operations include experiencing a disruption in the execution of the process. The operations include accessing a first array to obtain an index comprising the process identifier. The operations include accessing a second array at the obtained index to obtain a reference to one or more blocks of the shared memory. The process specific data is stored in the one or more blocks of the shared memory. The operations include reinitializing the process with the process specific data stored in the one or more blocks of the shared memory Other example aspects of the present disclosure are directed to systems, methods, aircrafts, avionics systems, devices, non-transitory computer-readable media for tracking memory allocation within shared memory. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems for tracking memory allocation within shared memory. The present disclosure can include a first array for storing process identifiers. For example, when a process initiates execution, the process identifier for the process can be entered into the first empty location in the first array. The process can include process specific data. One or more blocks of the shared memory can be allocated for the process specific data. A reference (e.g., pointer, etc.) to the process specific data and/or to the one or more blocks of shared memory can be used by the process to access the process specific data.

The present disclosure can include a second array for storing references to the process specific data. For example, after the process identifier is entered into the location in the first array, the reference to the process specific data of the process with the process identifier can be entered into a corresponding location in the second array. As a further example, a process with process identifier 45 can be entered at index 0 in the first array. The reference to the process specific data for the process with process identifier 45 can be entered at index 0 in the second array. The first array and the second array can have the same size. The second array can have a size greater than a size of the first array.

The present disclosure can include executing a process after a software failure in which memory remained intact. After such a software failure, the process can scan the first array. If the process identifier of the process if not in the first array, then the process identifier can be entered into the first empty location of the first array and the corresponding location in the second array can be used to store the reference to the one or more blocks of memory for the process specific data. If the process identifier of the process is located at an index in the first array, then the second array can be accessed using the index and a reference to process specific data can be obtained. The process specific data at the obtained reference can be loaded and used by the process.

In some embodiments, a memory management system can use the first array and the second array to track allocated memory. For example, if a process has a corresponding process identifier stored in an index in the first array, on boot up and/or re-boot, the process can claim and/or reclaim memory at the index in the second array.

In some embodiments, a memory management system can use the first array and the second array to track free memory. When a process terminates, the process identifier can be deleted from the first array. In an aspect, contemporaneously with deleting the process identifier from the first array, the entry in the second array at the same index as the process identifier in the first array can be deleted and the one or more memory blocks pointed to by the reference can be freed. In another aspect, the first array can be traversed at regular intervals. As the first array is traversed, a list of indexes comprising a process identifier can be made. Upon completion of the list, the second list can be traversed. If the second array has an entry at an index that does not appear on the list, then the one or more memory blocks pointed to by the reference at the index can be freed and the entry can be deleted. In an alternative aspect, as the first array is traversed, a list of empty indexes can be kept. In the alternative aspect, if the second array has an entry at an index that appears on the list, then the one or more memory blocks pointed to by the reference at the index can be freed and the entry can be deleted. In this way, the systems and methods according to example aspects of the present disclosure have a technical effect of tracking memory allocation to prevent memory corruption and/or memory leaks that can occur during initialization and/or reinitialization of processes.

Figure 1:
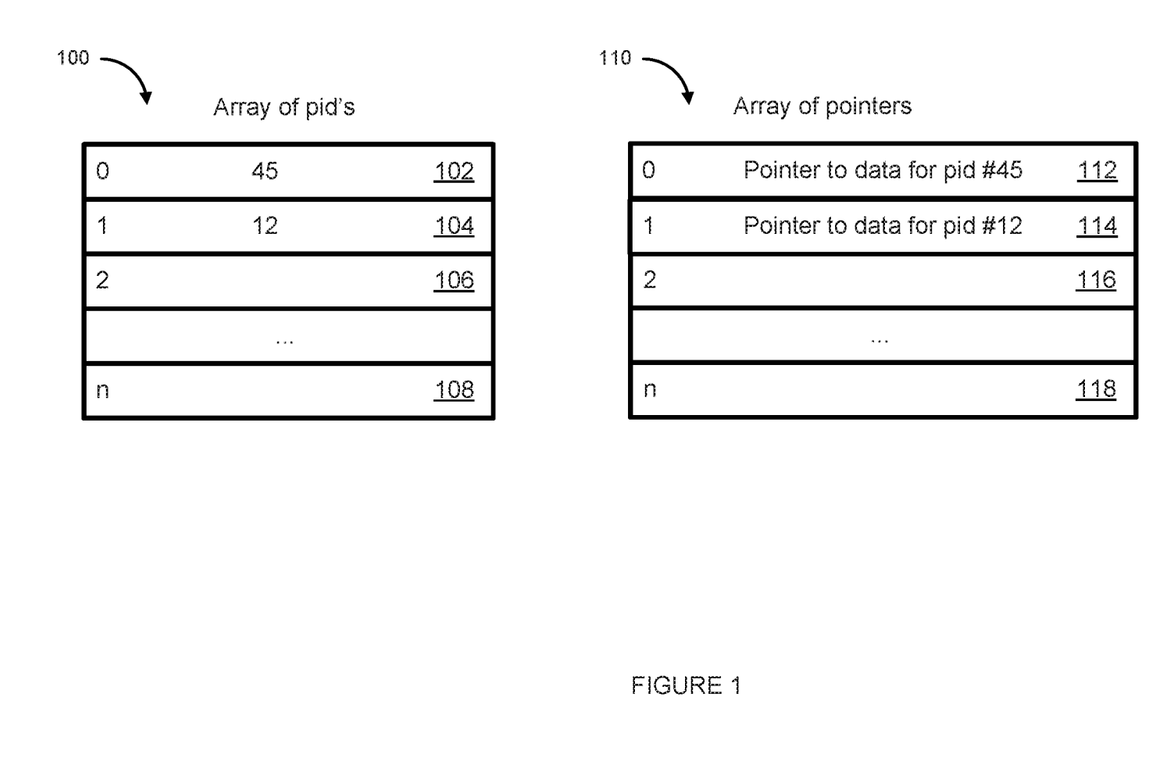
FIG. 1 depicts an example system for tracking memory allocation within shared memory according to example embodiments of the present disclosure.

FIG. 1 schematically depicts an example system for tracking memory allocation within shared memory according to example embodiments of the present disclosure. As shown, the system can include a first array 100. The first array can be used to store process identifiers (pids) for processes. A process identifiers can be unique for a process. A process identifiers can be identical for a process from execution to execution. A process can be any set of instructions executing, in which execution of the process uses the shared memory. The process can be associated with an aircraft and/or a component of an aircraft. The process can include process specific data. One or more memory blocks of the shared memory can be allocated for the process. The process specific data can be stored in the one or more memory blocks. A reference (e.g., pointer, etc.) can be associated with the process specific data and/or the one or more memory blocks storing the process specific data. Each entry (102, 104, 106, 108) can be accessed by an index. The first array can be consecutively indexed from 0 to n, wherein n represents a last index in the first array. The first array can store n+1 process identifiers. In another embodiment, the first array can be consecutively indexed from 1 to n+1. Each entry (102, 104, 106, 108) can be either empty or include a process identifier.

As shown, the system can include a second array 110. The second array can be used to store references associated with process specific data. Each entry (112, 114, 116, 118) can be accessed by an index. The second array can be consecutively indexed from 0 to n, wherein n represents a last index in the second array. The second array can store n+1 process identifiers. In another embodiment, the second array can be consecutively indexed from 1 to n+1. Each entry (112, 114, 116, 118) can be either empty or include a reference. The first array can have a same size as the second array. The second array can have a size greater than a size of the first array.

An entry at an index in the first array can correspond to an entry at the index in the second array. An entry at an index in the second array can correspond to an entry at the index in the first array. For example, an entry 102 at index 0 in the first array 100 can correspond to an entry 112 at index 0 in the second array 110. As a further example, a first process can have a first process identifier of 45. The entry 102 at index 0 in the first array 100 can have 45, indicating the first process. The entry 112 at index 0 in the second array 110 can have a first reference associated with process specific data for the first process. In the event of initialization and/or reinitialization of the first process, the first process can use (e.g., load, etc.) the process specific data referred to by the reference at the entry 112 at index 0 in the second array 110. As another example, an entry 104 at index 1 in the first array 100 can correspond to an entry 114 at index 1 in the second array 110. As a further example, a second process can have a second process identifier of 12. The entry 104 at index 1 in the first array 100 can have 12, indicating the second process. The entry 114 at index 1 in the second array 110 can have a second reference associated with process specific data for the second process. In the event of initialization and/or reinitialization of the second process, the second process can use (e.g., load, etc.) the process specific data referred to by the reference at the entry 114 at index 1 in the second array 110.

When a third process executes, a third process identifier associated with the third process can be entered as an entry 106 at index 2 in the first array 100. A third reference referring to process specific data associated with the third process can be entered as an entry 116 at index 2 of the second array 110. In the event of initialization and/or reinitialization of the third process, the third process can use (e.g., load, etc.) the process specific data referred to by the reference at the entry 116 at index 2 in the second array 110. Each time a process is executed, an entry can be added to the first array 100 and the second array 110 at the same index for each array. Each time a process is terminates, an entry can be removed from the first array 100 and the second array 110 at the same index for each array.

Figure 2:
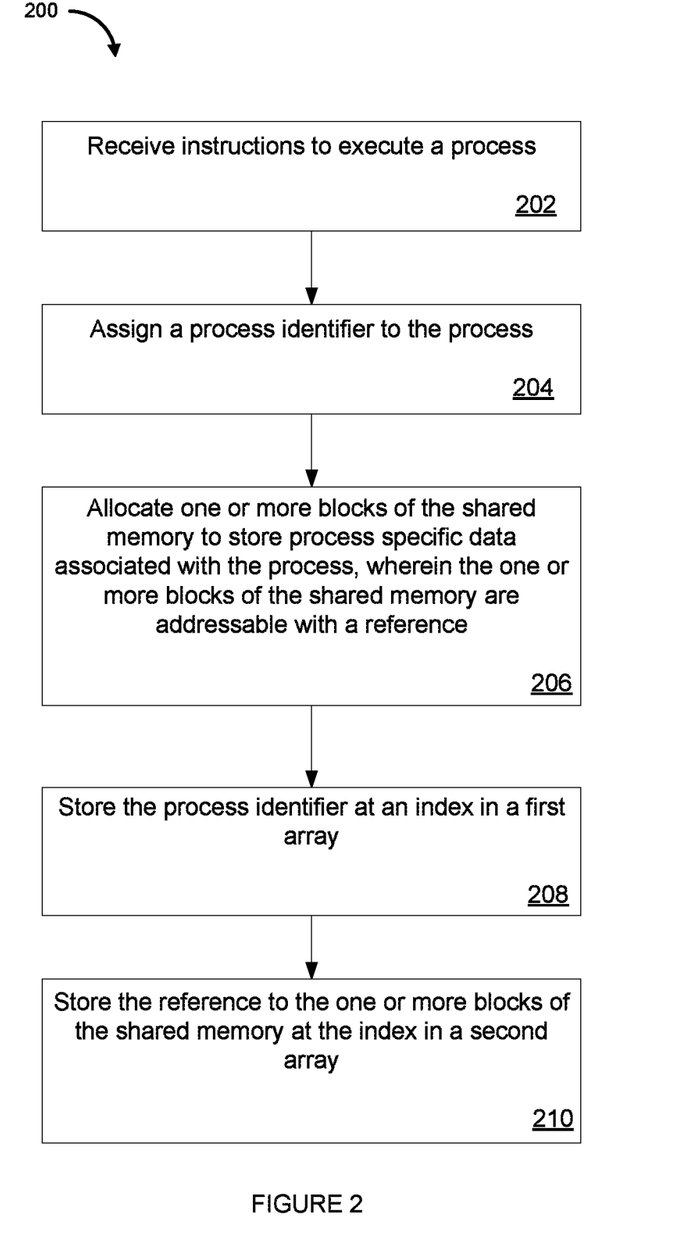
FIGS. 2-4 depict flow diagrams of example methods of notifying one or more observer objects according to example embodiments of the present disclosure.

FIG. 2 depicts a flow diagram of an example method (200) for tracking (e.g., managing, etc.) memory allocation within shared memory according to example embodiments of the present disclosure. FIG. 2 depicts steps performed in a particular order for purposes of illustration and discussion. Those of ordinary skill in the art, using the disclosures provided herein, will understand that the various steps of any of the methods disclosed herein can be adapted, omitted, rearranged, expanded or modified in various ways without deviating from the scope of the present disclosure.

At (202), instructions to execute a process can be received. The process can be a process for a flight management system. One or more computing devices, as described in FIG. 5, can use the shared memory. The one or more computing devices can be in an aircraft, or in one or more components of an aircraft. The process can be any set of instructions executing, in which execution of the process uses the shared memory.

At (204), a process identifier can be assigned to the process. The process identifier can be a next consecutive integer. Once assigned, the process identifier can be persistently associated with the process. At (206), one or more blocks of the shared memory can be allocated to store process specific data associated with the process. The one or more blocks of the shared memory can be addressable with a reference. The reference can be pointer to the one or more blocks of the shared memory. As an example, process specific data can include a counter for the process. As another example, process specific data can include a buffer for the process.

At (208), the process identifier can be stored at an index in a first array. The first array can be an array for storing process identifiers. In an embodiment, each entry in the first array can comprise at most one process identifier. In an embodiment, a process identifier can appear at most one time in the first array. At (210), the reference to the one or more blocks of the shared memory can be stored at the index in a second array. The second array can be an array for storing references to one or more blocks of the shared memory. In an embodiment, each entry in the second array can comprise at most one reference. In an embodiment, a reference can appear at most one time in the second array. A size of the first array can be the same as a size of the second array. In an embodiment, each entry in the first array can have a corresponding entry in the second array. In an embodiment, each entry in the second array can have a corresponding entry in the first array. Corresponding entries in the first array and the second array can have the same index.

Figure 3:
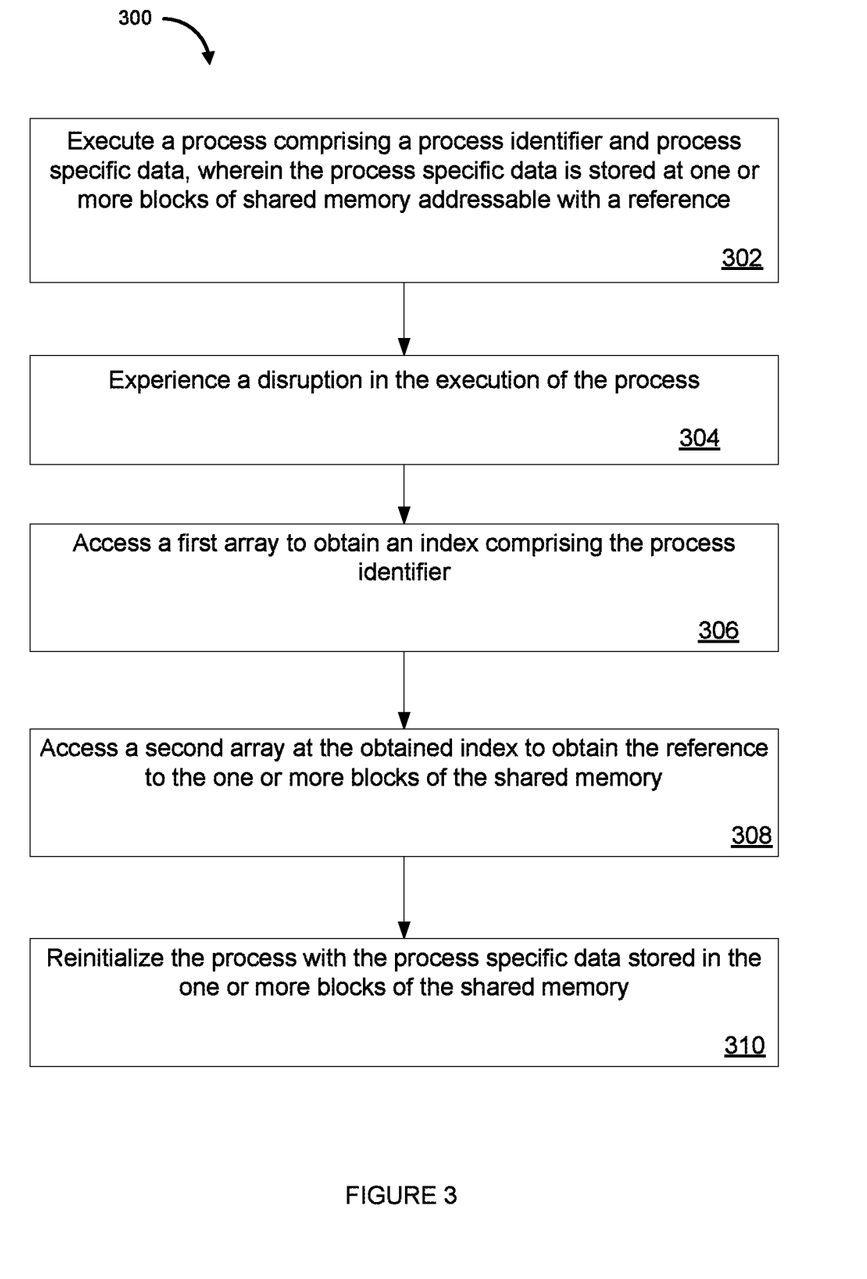

FIG. 3 depicts a flow diagram of an example method (300) for tracking (e.g., managing, etc.) memory allocation within shared memory according to example embodiments of the present disclosure. FIG. 3 depicts steps performed in a particular order for purposes of illustration and discussion. Those of ordinary skill in the art, using the disclosures provided herein, will understand that the various steps of any of the methods disclosed herein can be adapted, omitted, rearranged, expanded or modified in various ways without deviating from the scope of the present disclosure.

At (302), a process comprising a process identifier and process specific data can be executed (e.g., run, etc.). The process specific data can be stored at one or more blocks of shared memory addressable with a reference. The process can be a process for a flight management system. One or more computing devices, as described in FIG. 5, can use the shared memory. The one or more computing devices can be in an aircraft, or in one or more components of an aircraft. The A process can be any set of instructions executing, in which execution of the process uses the shared memory.

At (304), a disruption in the execution of the process can be experienced. The disruption can include a software failure. The disruption can include termination of the process. The shared memory can remain intact (e.g., allocated) after the disruption. Initialization of the process specific data can be required after the disruption before the process can resume execution. Reinitialization of the process specific data can be required after the disruption before the process can resume execution.

At (306), a first array can be accessed to obtain an index comprising the process identifier. The first array can be an array for storing process identifiers. In an embodiment, each entry in the first array can comprise at most one process identifier. In an embodiment, a process identifier can appear at most one time in the first array.

At (308), a second array can be accessed at the obtained index to obtain the reference to the one or more blocks of shared memory. The second array can be an array for storing references to one or more blocks of the shared memory. In an embodiment, each entry in the second array can comprise at most one reference. In an embodiment, a reference can appear at most one time in the second array. A size of the first array can be the same as a size of the second array. In an embodiment, each entry in the first array can have a corresponding entry in the second array. In an embodiment, each entry in the second array can have a corresponding entry in the first array. Corresponding entries in the first array and the second array can have the same index. At (310), the process can be reinitialized with the process specific data stored in the one or more blocks of the shared memory. The process can resume using the reinitialized process specific data.

Figure 4:
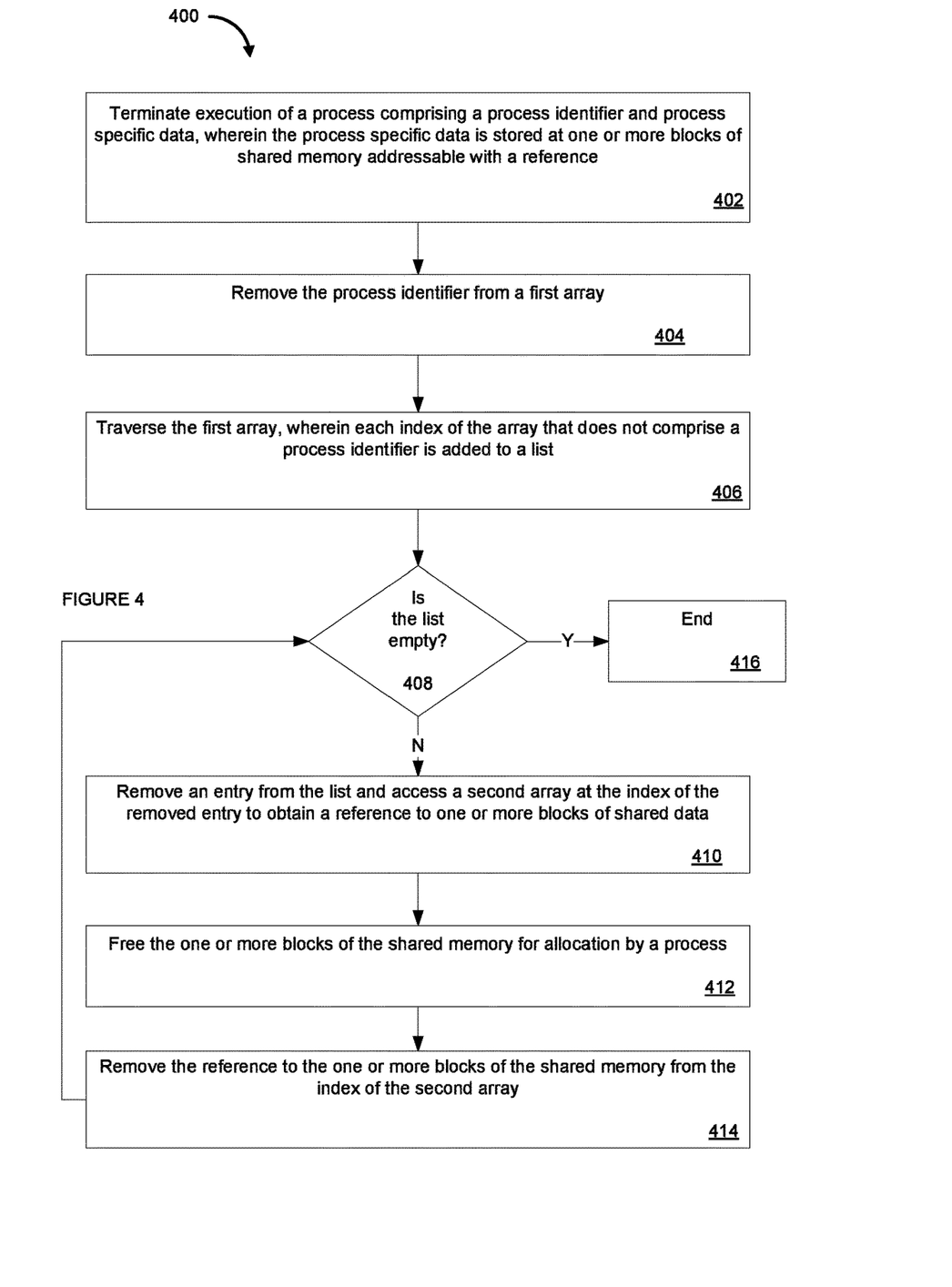

FIG. 4 depicts a flow diagram of an example method (400) for tracking (e.g., managing, etc.) memory allocation within shared memory according to example embodiments of the present disclosure. FIG. 4 depicts steps performed in a particular order for purposes of illustration and discussion. Those of ordinary skill in the art, using the disclosures provided herein, will understand that the various steps of any of the methods disclosed herein can be adapted, omitted, rearranged, expanded or modified in various ways without deviating from the scope of the present disclosure.

At (402), execution of a process can terminate. The process can comprise a process identifier and process specific data. The process specific data can be stored at one or more blocks of shared memory addressable with a reference. The process can be a process for a flight management system. One or more computing devices, as described in FIG. 5, can use the shared memory. The one or more computing devices can be in an aircraft, or in one or more components of an aircraft. The A process can be any set of instructions executing, in which execution of the process uses the shared memory.

At (404), the process identifier can be removed from a first array. The first array can be an array for storing process identifiers. In an embodiment, each entry in the first array can comprise at most one process identifier. In an embodiment, a process identifier can appear at most one time in the first array. At (406), the first array can be traversed. In an aspect, each index of the array that does not comprise a process identifier can be added to a list. In another aspect, each index of the array that comprises a process identifier can be added to a list.

At (408), a determination can be made of if the list is empty. If the list is not empty, then the method (400) can move to (410). At (410), an entry can be removed from the list. A second array can be accessed at the index of the removed entry to obtain a reference to one or more blocks of shared data. The second array can be an array for storing references to one or more blocks of the shared memory. In an embodiment, each entry in the second array can comprise at most one reference. In an embodiment, a reference can appear at most one time in the second array. A size of the first array can be the same as a size of the second array. In an embodiment, each entry in the first array can have a corresponding entry in the second array. In an embodiment, each entry in the second array can have a corresponding entry in the first array. Corresponding entries in the first array and the second array can have the same index.

At (412), the one or more blocks of the shared memory can be freed for allocation by a process. At (414), the reference to the one or more blocks of the shared memory can be removed from the index of the second array. The method (400) can next move to (408). At (408), if the list is empty, then the method (400) can move to (416) and the method (400) can end.

Figure 5:
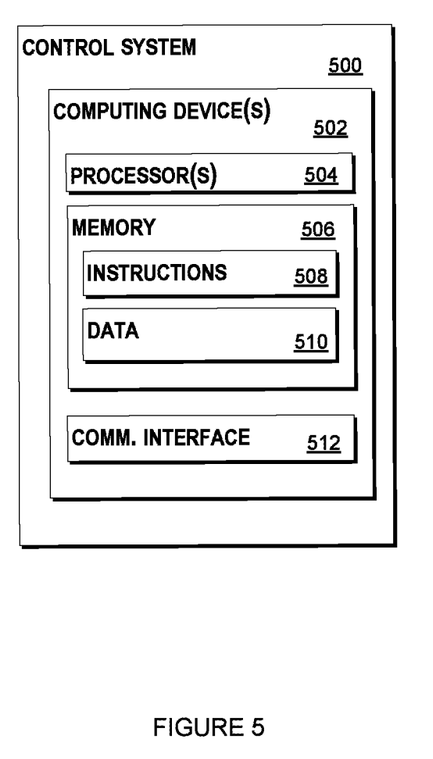
FIG. 5 depicts a computing system for implementing one or more aspects according to example embodiments of the present disclosure.

FIG. 5 depicts a block diagram of an example computing system that can be used to implement the control system 500 or other systems of the aircraft according to example embodiments of the present disclosure. As shown, the control system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices. In an aspect, the one or more memory device(s) 506 can comprise shared memory, wherein the shared memory is shared among processes executing on the one or more processor(s) 504.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for tracking (e.g., managing, etc.) memory allocation within shared memory, as described with reference to FIG. 2, FIG. 3, and/or FIG. 4, and/or any other operations or functions of the one or more computing device(s) 502. The operations for tracking (e.g., managing, etc.) memory allocation within shared memory, as described with reference to FIG. 2, FIG. 3, and/or FIG. 4, can execute when multiple processes come online at the same time.

The memory device(s) 506 can further store data 510 that can be accessed by the processors 504. For example, the data 510 can include process specific data, as described herein. The data 510 can include one or more array(s), table(s), function(s), algorithm(s), model(s), equation(s), etc. for tracking (e.g., managing, etc.) memory allocation within shared memory according to example embodiments of the present disclosure.

The one or more computing device(s) 502 can also include a communication interface 512 used to communicate, for example, with the other components of system. The communication interface 512 can include components for communicating with a user, such as an output device for outputting display, audio, and/or tactile information to the user. The communication interface 512 can include any suitable components for interfacing with one or more network(s), including for example, transmitters, receivers, ports, controllers, antennas, or other suitable components.

Figure 6:
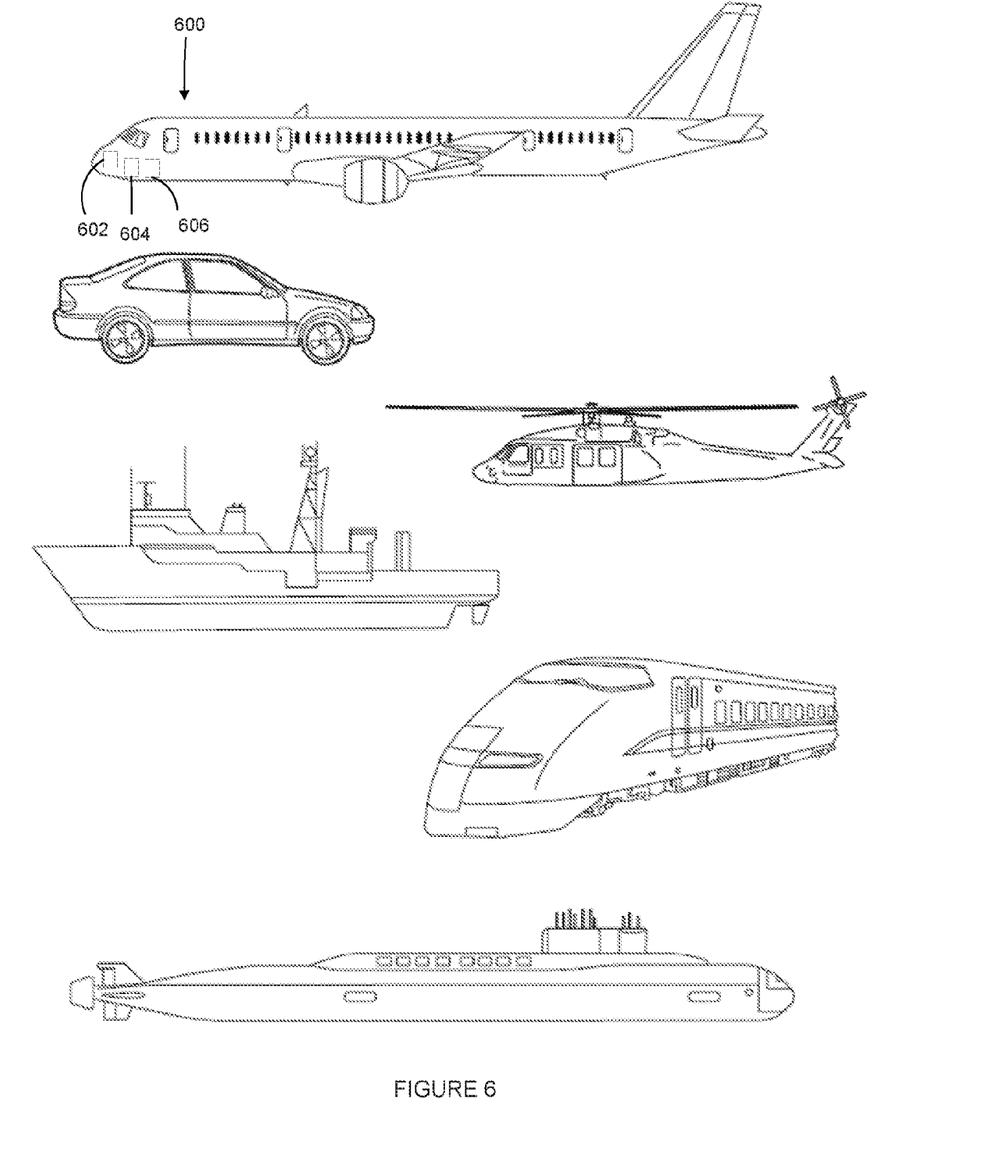
FIG. 6 depicts a plurality of vehicles according to example embodiments of the present disclosure.

FIG. 6 depicts a plurality of vehicles according to example embodiments of the present disclosure. The systems and methods of the present disclosure can be implemented on an aircraft, helicopter, automobile, boat, submarine, train, and/or any other suitable vehicles. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

One of the vehicles can be an aircraft 600. The aircraft 600 can include one or more computing device(s) 602 as described in reference to FIG. 5. The one or more computing device(s) 602 can include shared memory. The aircraft 600 can include a first component 604. The first component 604 can include one or more computing device(s) as described in reference to FIG. 5 and/or can access the one or more computing device(s) 602 for running a first process. The first process can use the shared memory. The aircraft 600 can include a second component 606. The second component 606 can include one or more computing device(s) as described in reference to FIG. 5 and/or can access the one or more computing device(s) 602 for running a second process. The second process can use the shared memory.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for tracking memory allocation within shared memory comprising:
receiving, by one or more processors, instructions to execute a process;
assigning, by the one or more processors, a process identifier to the process;
allocating, by the one or more processors, one or more blocks of the shared memory to store process specific data associated with the process, wherein the one or more blocks of the shared memory are addressable with a reference;
storing, by the one or more processors, the process identifier at an index in a first array;
storing, by the one or more processors, the reference to the one or more blocks of the shared memory at the index in a second array;
executing, by the one or more processors, the process;
determining a disruption in the execution of the process;
accessing, by the one or more processors, the first array to obtain the index comprising the process identifier;
accessing, by the one or more processors, the second array at the obtained index to obtain the reference to the one or more blocks of the shared memory; and
reinitializing, by the one or more processors, the process with the process specific data stored in the one or more blocks of the shared memory.

2. The method of claim 1, further comprising terminating, by the one or more processors, execution of the process.

3. The method of claim 2, further comprising:
removing, by the one or more processors, the process identifier from the index in the first array; and
removing, by the one or more processors, the reference to the one or more blocks of the shared memory from the index in the second array.

4. The method of claim 3, further comprising freeing, by the one or more processors the one or more blocks of the shared memory for allocation by another process.

5. The method of claim 2, further comprising
resuming, by the one or more processors execution of the process causing initialization, wherein the initialization comprises:
accessing, by the one or more processors, the first array to obtain the index comprising the process identifier;
accessing, by the one or more processors, the second array at the obtained index to obtain the reference to the one or more blocks of shared memory; and
initializing, by the one or more processors, variables of the process with the process specific data at the one or more blocks of the shared memory.

6. The method of claim 2, further comprising removing, by the one or more processors, the process identifier from the index in the first array.

7. The method of claim 6, further comprising:
traversing, by the one or more processors, the first array, wherein each index of the array that does not comprise a process identifier is added to a list;
for each index in the list:
accessing, by the one or more processors, the second array at the index to obtain a reference to one or more blocks of shared data;
freeing, by the one or more processors, the one or more blocks of the shared memory for allocation by a process; and
removing, by the one or more processors, the reference to the one or more blocks of the shared memory from the index of the second array.

8. The method of claim 1, wherein a size of the first array is equal to a size of the second array.

9. The method of claim 1, wherein the process comprises a process for a flight management system.

10. The method of claim 1, wherein one or more computing devices on an aircraft comprise the shared memory.

11. A system for tracking memory allocation within shared memory in a vehicle, the system comprising one or more processors and one or more memory devices, the one or more memory devices storing instructions that when executed by the one or more processors configure the one or more processors to:
execute a process, wherein the process comprises a process identifier and process specific data;
determine a disruption in the execution of the process;
access a first array to obtain an index comprising the process identifier;
access a second array at the obtained index to obtain a reference to one or more blocks of the shared memory, wherein the process specific data is stored in the one or more blocks of the shared memory; and
reinitialize the process with the process specific data stored in the one or more blocks of the shared memory.

12. The system of claim 11, wherein the instructions when executed by the one or more processors configure the one or more processors to:
receive instructions to execute the process;
assign the process identifier to the process;
allocate the one or more blocks of the shared memory to store the process specific data associated with the process, wherein the one or more blocks of the shared memory are addressable with the reference;
store the process identifier at the index in the first array; and
store the reference to the one or more blocks of the shared memory at the index in the second array.

13. The system of claim 12, wherein the instructions when executed by the one or more processors configure the one or more processors to terminate execution of the process.

14. The system of claim 13, wherein the instructions when executed by the one or more processors configure the one or more processors to:
remove the process identifier from the index in the first array; and
remove the reference to the one or more blocks of the shared memory from the index in the second array.

15. The system of claim 14, wherein the instructions when executed by the one or more processors configure the one or more processors to free the one or more blocks of the shared memory for allocation by another process.

16. The system of claim 11, wherein a size of the first array is equal to a size of the second array.

17. The system of claim 11, wherein the process comprises a process for a flight management system.

18. The system of claim 11, wherein one or more computing devices on an aircraft comprise the shared memory.

19. A aircraft comprising:
a shared memory;
a computing system comprising one or more processors located on the aircraft, the shared memory storing instructions that when executed by the one or more processors cause the one or more processors to:
receive instructions to execute a process;
assign a process identifier to the process;
allocate one or more blocks of the shared memory to store process specific data associated with the process, wherein the one or more blocks of the shared memory are addressable with a reference;
store the process identifier at an index in a first array;
store the reference to the one or more blocks of the shared memory at the index in a second array;
execute the process;
determine a disruption in the execution of the process;
access the first array to obtain the index comprising the process identifier;
access the second array at the obtained index to obtain the reference to the one or more blocks of the shared memory; and
reinitialize the process with the process specific data stored in the one or more blocks of the shared memory.

* * * * *